Nov. 12, 1940.          E. S. GANDRUD                 2,221,046
                        ANIMAL STALL
                   Filed Oct. 24, 1938      4 Sheets-Sheet 2
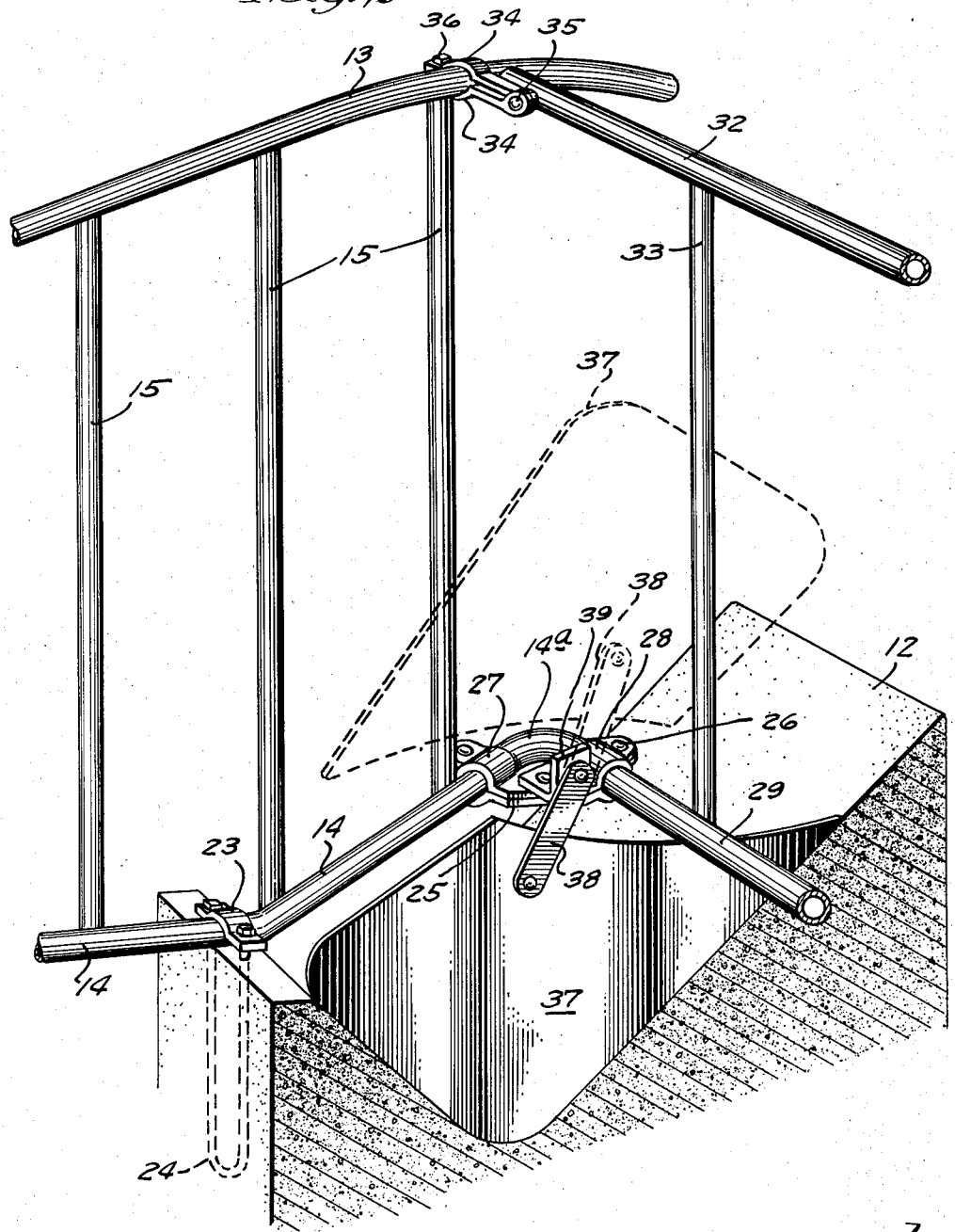

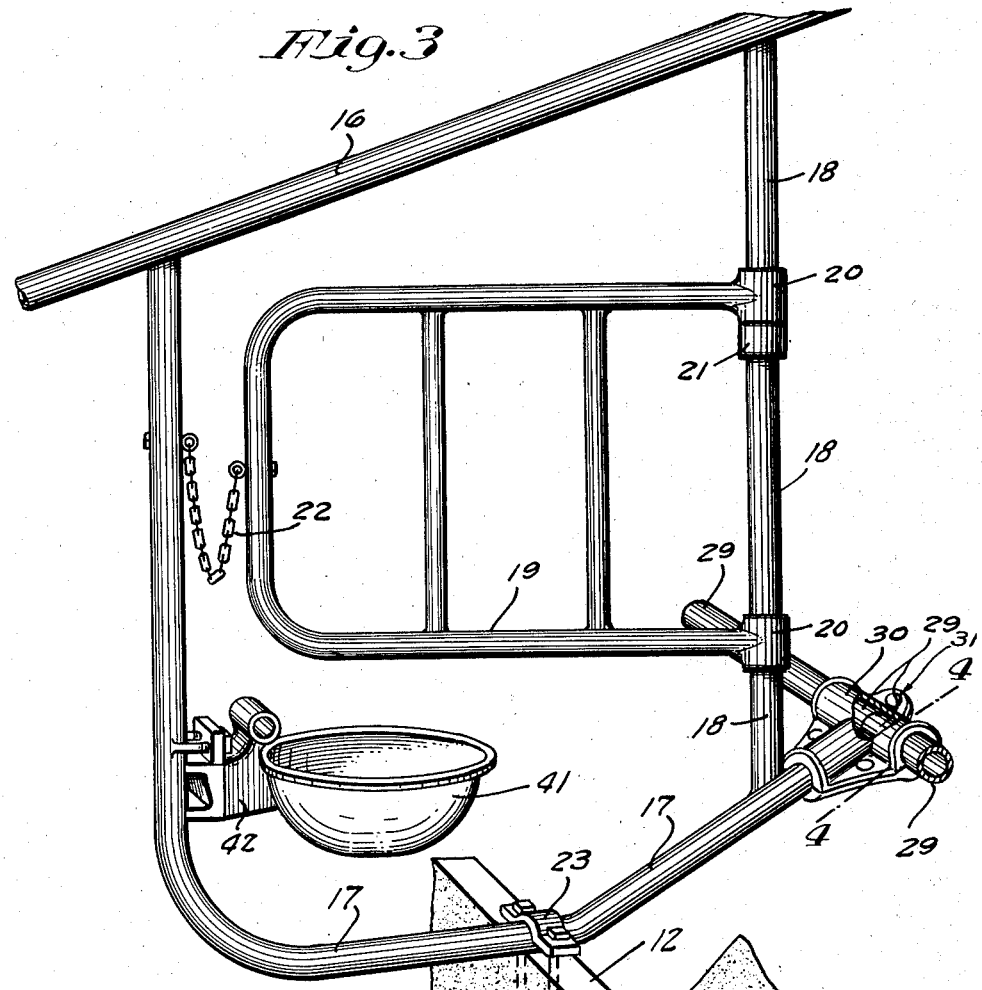
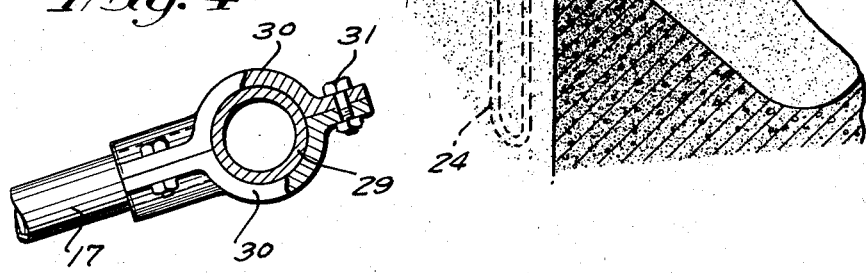

Nov. 12, 1940.  E. S. GANDRUD  2,221,046
ANIMAL STALL
Filed Oct. 24, 1938  4 Sheets-Sheet 4
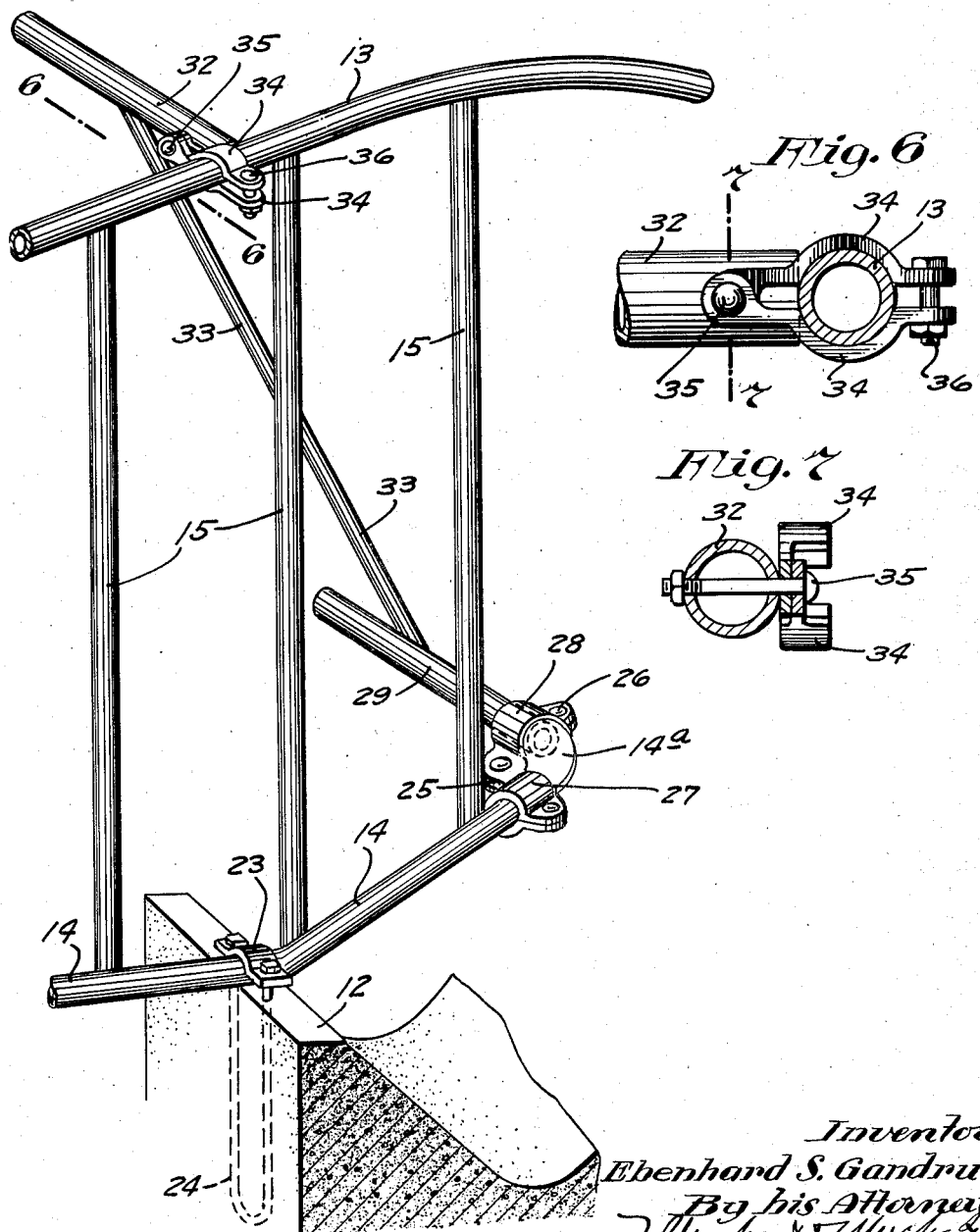

Patented Nov. 12, 1940

2,221,046

UNITED STATES PATENT OFFICE 2,221,046

ANIMAL STALL

Ebenhard S. Gandrud, Owatonna, Minn.

Application October 24, 1938, Serial No. 236,717

3 Claims. (Cl. 119—27)

My present invention relates to that type of animal stall usually designated as a cow stall. In some respects the present invention is in the nature of an improvement on or modification of the animal stall disclosed and claimed in my prior Patent No. 2,085,308 of June 29, 1937.

The major objects of the present invention briefly stated are to obtain with a minimum of material a strong and durable stall structure, the main elements of which, except for the feed trough, are made of metal, preferably steel, tubes or pipes, which may be fabricated at the factory, packed in small space for shipment and quickly set up at the place of installment. The trough itself will preferably be a concrete structure and may or may not be made integral with a floor structure. This trough is utilized as the main support for the metallic stall-forming elements. By this arrangement the use of individual posts is substantially eliminated.

The stall structure may be made up of units sufficient to make any desired number of stalls. The structure is such that two stalls, for example, can be formed by the use of two major partition panels and one intermediate or minor partition panel. These panels are seated on the rear wall of the feed trough and project like cantilevers about one-half way over the trough and support upright barred guard racks about the trough. Hay mangers are formed or provided on the front portions of the trough forward of the guard racks.

The features above generally outlined and others are illustrated and will be described in connection with the accompanying drawings wherein like characters indicate like parts throughout the several views.

Referring to the drawings:

Fig. 2 is a fragmentary section taken approximately on the line 2—2 of Fig. 1;

Fig. 3 is a fragmentary section taken approximately on the line 3—3 of Fig. 1;

Fig. 4 is a view taken approximately on the line 4—4 of Fig. 3;

Fig. 5 is a section taken approximately on the line 5—5 of Fig. 1;

Fig. 6 is a detail in section taken on the line 6—6 of Fig. 5; and

Fig. 7 is a section taken on the line 7—7 of Fig. 6.

Figure 1:
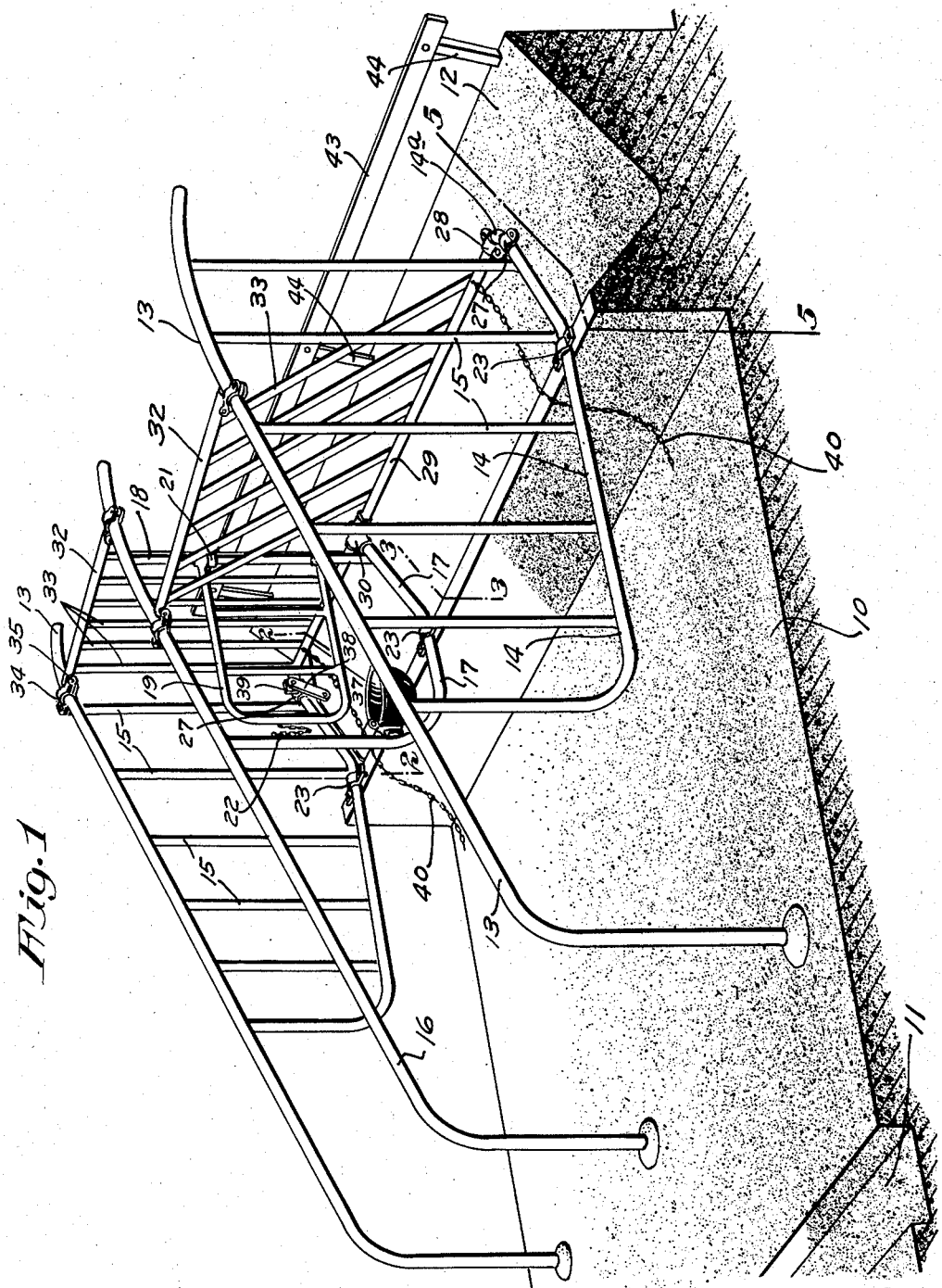
Fig. 1 is a perspective illustrating the invention as incorporated in two stalls, some parts of the trough and floor structure being shown in section.

The concrete floor structure is indicated at 10 and is formed at the rear with a drain trough 11 and at the front with a concrete feed trough 12, which parts preferably, and as illustrated, are monolithic concrete structures, but, of course, may be otherwise formed. The interior of the trough is inclined abruptly rearward from its front wall and less abruptly from its rear wall. The two stalls illustrated are formed with two major partition panels and an intermediate partition panel. The major panels are formed by top rails 13, bottom rails 14 and upright tie rods 15, the elements of which are rigidly connected, preferably by electric welding. The lower rails 14, at their rear ends, are turned upward and welded or otherwise rigidly secured to the intermediate portions of the top rails 13; while the front ends of the bottom rails 14 rest upon the rear wall of the trough and project over the trough to a point about midway between the front and rear wall thereof. The rear ends of the top rails 13 are turned downward and are embedded or otherwise rigidly anchored to the floor 10.

The intermediate or secondary partition panel is made up of a top rail 16 and a bottom rail 17. The rear end of the bottom rail 17 is turned upward and welded or otherwise rigidly secured to the intermediate portion of the top rail 16. An upright tie rod 18 extends between and is rigidly secured by welding or otherwise to the front end portion of the bottom rail 17 and to an upwardly projecting portion of the top rail 16. The rear end of the top rail 16, like top rails 13, is turned downward and is embedded or otherwise rigidly anchored to the floor structure 10.

Working in the panel or opening formed by the rails 16 and 17 and tie rod 18, is a barred gate 19, best shown in detail in Fig. 3, wherein the top and bottom rails of said gate are shown as provided with sleeves 20 pivoted on the tie rod 18 and held against downward sliding movement by a stop collar 21, rigidly secured on said tie rod 18. Oscillatory movements of the gate 19 are limited by a flexible connection such as a chain 22 attached to the said gate and to the upturned portion of the bottom rail 17. In practice I have found that tangling of the chain 22 will be prevented by making the point of attachment of the rear end of the chain to the rail 17 at a point higher than the point of attachment of the chain to the gate, see Fig. 3.

The bottom rails 14 of the major panels, and the bottom rails 17 of the intermediate panels are rigidly anchored to the rear wall of the feed trough by suitable means such as metallic clips 23 detachably but rigidly secured to said trough by nut-equipped U bolts 24, the bodies of which latter are embedded in the concrete of the trough.
The front ends of said bottom rails 14 are bent laterally at right angles as indicated at 14a, see particularly Figs. 1 and 2, and are seated in corner brackets 25. These corner brackets 25 are two-part or split brackets, the members of which are originally connected by bolts or rivets 26. Moreover, these brackets 25 are formed with sleeve portions 27 and 28. The bottom rails 14 are passed through the sleeves 27 and their bent ends are inserted part way into the sleeves 28.
Transverse rock shafts 29, that are located well above the bottom of the deepest portion of the trough 12, are loosely seated at their ends in the sleeves 28.

Rigidly secured to the front ends of the bottom rails 17 of the intermediate partition panel is a T-shaped coupling head 30, see particularly Figs. 1, 3 and 4. This coupling head 30 is a split or two-part member, the sections of which are secured together by suitable means such as nut-equipped bolts 31. For each stall there is a rock shaft 29, the adjoining ends of which are independently and rotatively seated in the coupling head 30.

The rock shafts 29 constitute the bottom elements of adjustable barred guard racks which include also a top bar 32 and upright tie rods 33. The tie rods 33 are rigidly secured to the respective rock shafts 29 and top rail 32 by suitable means such as arc welding. These guard racks are thus mounted for pivotal forward and rearward movements on the axis of their rock shaft 29; and here it will be noted that the front ends of the top rails 13 and 16 of the partition panels are curved on an arc, the axis of which is the axis of the rock shafts 29. This will cause the top bar 32 to move along and coincident with the arc or curve of the front ends of the said rails 13 and 16.

To independently secure the guard racks in the various forward and rearward adjustments, I preferably employ clamping devices, best shown in Figs. 5, 6 and 7. These clamps are made up of clamping levers 34 pivotally connected at their rear ends and to the ends of the top rails 32 by nut-equipped bolts 35 passed through said rail 32. The levers 34 are curved to fit and embrace the curved front end portions of the top rails 13 and 16, and at their free ends they are connected by nut-equipped clamping bolts 36.

As a means for dividing the feed trough into sections for the respective stalls, I provide dividing plates 37 best shown in Fig. 2, but also shown in Fig. 1. The lower edges of the dividing plates 37 are made to fit the cross section of the trough. These plates 37 are mounted for pivotal movements in vertical planes to and from operative positions, see dotted lines in Fig. 2, and are connected by links 38 to lugs 39 on the corner brackets 25. When plates 37 are lowered, they will be held in lowered position by gravity, and when turned into the upper or dotted line inoperative positions, their links 38 will be beyond a vertical and said plates will then, by gravity, be held in inoperative positions.

The numeral 40 indicates chains attached to the stall structure and preferably to the rock shafts 29. These chains will be of such length and arrangement that they can be used to secure the cow properly within the stall.

In Figs. 1 and 3 there is shown a drinking bowl 41 supported by bracket 42 from the upturned portion of the bottom rails 17 of the intermediate partition panel. This bowl is located just below the guard 19. In actual practice the customary automatic water supply device will be used in connection with the bowl 41.

As an important feature, a hay manger is formed on or over the front portion of the feed trough in front of the guard racks 29, 32 and 33. This manger is formed by part of the trough and by a longitudinal rail 43 secured to the front of the trough by supporting members 44.

All of the above described elements 13, 14, 15, 16, 17, 18, 19, 29, 32 and 33 may be, and preferably are, steel tubing or pipe sections which give a maximum of strength with a minimum of weight. Also, the manger-forming members 43 and 44 may be tubular metallic members.

By means of the chains 40 or any other suitable devices, the cows will be tied within the stalls in the proper relation to the feed trough and to the drain trough. Here it will be noted that the chains 40 are anchored to the stall structure at sides opposite to the intermediately located gate 19 and water bowl 41. These attaching chains, therefore, will be of such length that the cows in the two stalls can reach the same drinking bowl but cannot reach the cow in an adjacent stall with their heads or horns. The gate 19 will swing freely far enough to let the cow in either stall drink out of the water bowl, but the gate will not swing far enough to permit the cow in one stall to eat out of that part of the feed trough that is in front of the adjacent stall. By lowering the proper dividing plate 37, the cow in the one stall is prevented from eating out of the stall section in front of the adjacent stall. When the trough is to be cleaned out, the plate or plates 37 may be swung up out of the way as shown by dotted lines in Fig. 2. This swinging movement of the plate from and to operative position is permitted by the link 38 which is pivoted at both ends.

The soft or fine feed will be poured into the feed trough from the front part thereof and it will, of course, run to the bottom of the trough and will be where it can be reached by the nose of the cow through the ample space between the rock shafts or members 29 and the rear wall of the trough. The said shafts 29 are located well above the bottom of the trough but, nevertheless, the guard rack will stop the hay and prevent the same from reaching the bottom of the trough so that the hay must be reached from the manger by the animal's nose poked through the spaces between the bars 33. These racks are made forwardly and rearwardly adjustable to vary the length of the stall and adapt the same to cows of different lengths and to position the cow properly in respect to the trough or gutter 11. If the adjustment of the racks is extreme, the clamps 34 of Fig. 6 may be opened up to permit movement past the bars 15 of the partition panels. Also, it will be noted that if it should be desirable to exactly align two racks, the clamps 34 may be shifted from one side to the other of the bar 32 to which they are attached simply by removing, reversing and replacing the bolts 35.

The drawings of the above application show a commercial device, the efficiency and desirability of which has been thoroughly demonstrated in practice. It appears to have accomplished a maximum of strength in the stall structure at a comparatively low cost of manufacture and installation. The stalls are not only very neat in appearance but are skeletonized so that free passage of air and light is afforded.

Obviously various alterations in the details of construction and arrangement of parts may be made within the scope of the invention herein disclosed and claimed.

What I claim is:

1. In a device of the kind described, a feed trough having a substantially V-shaped cross-sectional depression, laterally spaced partition-forming panels having top rails extended rearward therefrom and downward and anchored to the floor, said panels having bottom rails seated on and supported by the rear wall of said trough and projecting, as cantilever extensions, over said trough, and guard racks working in the space between said panels with their lower portions pivoted to the forwardly projecting portions of the lower rails of said panels, and means for adjustably securing the upper portions of said racks to the upper rails of said panels, said last noted means comprising two-part clamps pivotally connected to the upper portion of said rack and slidable on the upper rails of said panels.

2. In a stall structure, a feed trough and laterally spaced partition-forming panels, said panels comprising vertically spaced top and bottom rails both extending forwardly and rearwardly of the rear wall of said trough, said bottom rails terminating rearwardly of the front wall of said trough and above the bottom of the trough with their intermediate portions anchored on and supported solely by the rear wall of said trough, the rear ends of said top rails being anchored to the floor of the stall structure, a guard rack pivotally mounted on the front ends of said bottom rails clear of the bottom of the trough, and means for securing said guard rack to said top rails, in different angular adjustments.

3. In a stall structure, a feed trough and laterally spaced partition-forming panels, said panels comprising vertically spaced top and bottom rails both extending forwardly and rearwardly of the rear wall of said trough, said bottom rails being connected to the upper rail rearwardly of the rear wall of said trough and terminating rearwardly of the front wall of said trough above the bottom of the trough with their intermediate portions anchored on and supported by the rear wall of said trough, the rear ends of said top rails being downwardly bent beyond their connections with said bottom rails and directly anchored to the floor of the stall structure, a guard rack pivotally mounted on the front ends of said bottom rails clear of the bottom of the trough, and means for adjustably securing said guard rack to said top rail.

EBENHARD S. GANDRUD.